(No Model.)
W. W. HASTINGS.
CYCLOMETER.
No. 585,519. Patented June 29, 1897.
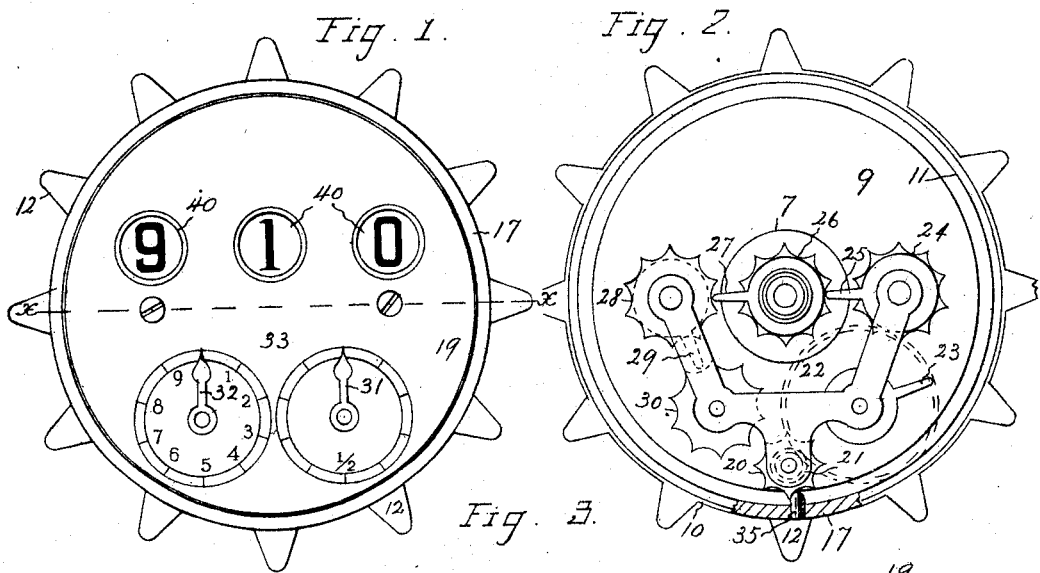
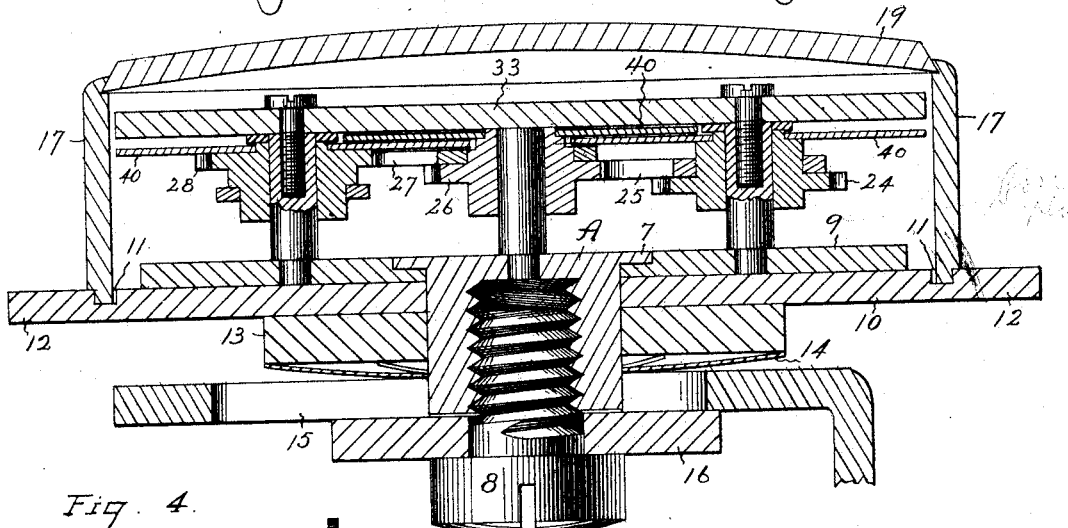
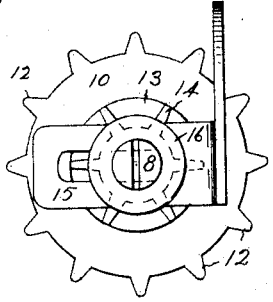
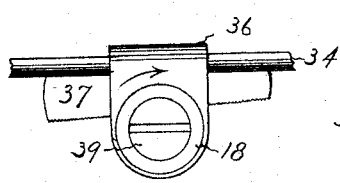
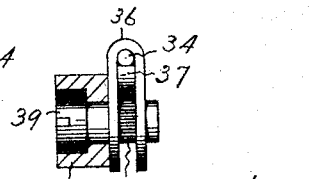
Witnesses
Inventor
Walter W. Hastings.
By James Shepard
Atty.

UNITED STATES PATENT OFFICE.

WALTER W. HASTINGS, OF JERSEY CITY, NEW JERSEY.

CYCLOMETER.

SPECIFICATION forming part of Letters Patent No. 585,519, dated June 29, 1897.

Application filed March 30, 1896. Serial No. 585,347. (No model.)

*To all whom it may concern:*

Be it known that I, WALTER W. HASTINGS, a citizen of the United States, residing at Jersey City, in the county of Hudson and State of New Jersey, have invented certain new and useful Improvements in Cyclometers, of which the following is a specification.

My invention relates to improvements in cyclometers; and the objects of my improvements are simplicity and economy in construction and general efficiency of the machine.

In the accompanying drawings, Figure 1 is a face view of my cyclometer. Fig. 2 is a face view of the main interior mechanism with a portion of the case in section, the dial and numeral-disks being removed. Fig. 3 is an enlarged sectional view of my cyclometer on the line $x$ $x$ of Fig. 1. Fig. 4 is a rear view on a smaller scale than Figs. 1 and 2. Fig. 5 is a side view of the striker and a portion of a wheel-spoke on the same scale as Figs. 1 and 2. Fig. 6 is an edge view of the same with the striker-roller and wheel-spoke in section. Fig. 7 is an enlarged transverse section of the striker-supporting stud.

A designates a hub having a flange 7 at its inner end, while its outer end is bored and threaded to receive the screw 8. To the flanged end of this hub the base-plate 9 of the interior mechanism is fixedly secured. The back 10 of the case is provided with an annular groove 11, Fig. 3, and regularly-spaced points or prongs 12 at its outer edge.
It is mounted to rotate loosely on the body of the hub A just outside of or in rear of the base-plate 9. A washer 13, spring 14, bracket 15, and washer 16 are placed on said stud, as shown, and secured by the screw 8, whereby the bracket is firmly held to the rear plate or back of the case for securing the cyclometer to a bicycle, while at the same time the back of the case may rotate and yet be held with sufficient friction to prevent it from moving accidentally, and also when moved by the striker cause it to stop as soon as the striker leaves it. The shape of the spring 14 in plan view is indicated by broken lines in Fig. 4. That portion of the stud A which receives said spring and the bracket is slabbed off on two sides, as indicated by the parallel broken lines in Fig. 4, the slot in the bracket and the hole in the spring being fitted to these slabbed-off sides, so that neither the spring nor the bracket can rotate on the hub. The ring which forms the side edges 17 of the case is let into the groove 11, Fig. 3, and made fast to the back, so as to move therewith, and carries at its front the usual glass or crystal 19.

Upon the base-plate, near the side edge of the case, there is mounted a toothed wheel 20, Fig. 2, which carries with it a pinion, (indicated by the broken-line circles 21.) This pinion engages with and drives the gear-wheel 22, the same being indicated in broken lines in said Fig. 2. This gear-wheel carries a projection or finger 23 for engaging and driving the second toothed wheel 24, which in turn carries the finger 25. Said finger 25 engages and drives the third toothed wheel 26, which wheel carries a finger 27 for engaging and driving the fourth toothed wheel 28. Said wheel 28 carries a finger 29 (shown in broken lines) for engaging and driving the fifth and last toothed wheel 30. The wheels 24, 26, and 28 each carry numeral-disks 40, bearing the nine digits and a cipher, while the shafts of the gear-wheel 22 and toothed wheel 30 carry pointers 31 and 32, respectively. A dial 33 covers the interior mechanism, is provided with suitable openings to expose the figures on the numeral-disks, (the same showing one figure only on each of the said three disks,) and is properly graduated and marked under the pointers 31 and 32.

The parts are arranged to have the gear-wheel 22, its finger 23, and pointer 31 make one revolution for each mile, thereby moving the second toothed wheel 24 one division or tenth of a revolution for every mile, the third toothed wheel 26 one division for every ten miles, the fourth toothed wheel 28 one division for every hundred miles, and the fifth toothed wheel 30 one division for every thousand miles. The interior counting mechanism herein shown and described is not of itself materially different from prior counting mechanisms and other known mechanism may be substituted therefor.

The parts are actuated by means of the striker-roller or projection 18, secured to one of the spokes 34 of one of the bicycle-wheels, so as to strike one of the points 12 of the back of the case at each revolution of the said wheel and carry the case a fractional part (one-twelfth, as shown) of a revolution. A pin or projection 35 in the ring or side edge 17 of the case engages with and drives the toothed wheel 20 one division for every revolution of the case.

While my cyclometer may be actuated by any projection or striker so secured to the wheel as to move the case one division at every revolution of said wheel, I prefer to employ the special striker herein shown. The striker-frame 36 is formed of a plate of sheet metal doubled upon itself in U form, thereby forming a spoke-socket at the bottom of the U. In the legs of this frame I pivot a stud or post 38, which is very finely fluted or toothed on its periphery, the teeth extending longitudinally of its axis over the wedge-bearing portion. The frame is placed over one of the spokes 34, the stud inserted in the frame, and the whole secured by interposing a wedge 37 between the spoke and the toothed periphery of the stud. The stud may now be turned on its axis in the direction indicated by the dart in Fig. 5, thereby firmly drawing the wedge into place by means of the toothed periphery of the stud. I have illustrated it with a slotted head 39, to which a screw-driver may be applied, and with a striker-roller 18, of leather or other suitable material, secured in place on said head. Other means may of course be provided for turning the stud without avoiding my invention. The fluted or toothed periphery of the stud should be hardened, and if the wedge is left soft the stud will draw it into place. If desired, however, one edge of the wedge may be correspondingly transversely toothed or fluted and then hardened. The striker can be detached from the spoke when desired by turning the stud in the reverse direction to release the wedge, and then the stud may be pulled out to detach the striker-frame.

By my improvements I greatly simplify the construction, reducing it to the fewest possible number of parts. The back of the case is in the form of a driving-wheel that is concentric with the case for actuating the interior mechanism. The striker can be readily attached and detached to and from the wire spokes of the wheel and is very securely held in place.

I claim as my invention—

1. A cyclometer having the stud or support A, the base-plate fixedly secured thereto, counting mechanism mounted on said base-plate, the case-back mounted to rotate on said stud and having points or prongs at its edge, frictional devices for controlling the movement of said back on said stud, and a pin or projection carried with the rotating case-back for actuating the interior counting mechanism, substantially as described and for the purpose specified.

2. A striker for cyclometers consisting mainly of a frame having a spoke-receiving socket, a stud arranged to roll in said frame and a wedge adapted to rest between the spoke in said socket and the periphery of said stud and to be moved by rolling said stud, substantially as described and for the purpose specified.

WALTER W. HASTINGS.

Witnesses:
WM. C. ROBERTS,
J. B. WOLFGANG.